(12) United States Patent
Ma et al.

(10) Patent No.: US 11,525,568 B2
(45) Date of Patent: Dec. 13, 2022

(54) LIGHTING MODULE AND REFRIGERATION APPLIANCE WITH LIGHTING MODULE

(71) Applicant: BSH Hausgeraete GmbH, Munich (DE)

(72) Inventors: Bo Ma, Nanjing (CN); Jiahao Zhang, Nanjing (CN); Haiqing Zhou, Nanjing (CN)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 17/501,364

(22) Filed: Oct. 14, 2021

(65) Prior Publication Data

US 2022/0120432 A1 Apr. 21, 2022

(30) Foreign Application Priority Data

Oct. 21, 2020 (CN) .......................... 202022361129.9

(51) Int. Cl.
| | |
|---|---|
| *F21V 33/00* | (2006.01) |
| *F21V 17/16* | (2006.01) |
| *F21V 8/00* | (2006.01) |
| *F25D 27/00* | (2006.01) |
| *F25D 23/02* | (2006.01) |
| *F21W 131/305* | (2006.01) |

(52) U.S. Cl.
CPC ........ *F21V 33/0044* (2013.01); *F21V 17/164* (2013.01); *F25D 23/02* (2013.01); *F25D 23/028* (2013.01); *F25D 27/00* (2013.01); *G02B 6/0055* (2013.01); *G02B 6/0086* (2013.01); *G02B 6/0088* (2013.01); *F21W 2131/305* (2013.01); *F25D 2400/36* (2013.01)

(58) Field of Classification Search
CPC ...... F25D 27/00; F25D 27/005; F21V 17/164; G02B 6/0086
See application file for complete search history.

(56) References Cited

U.S. PATENT DOCUMENTS

| 11,172,768 | B2 | 11/2021 | Lee | |
|---|---|---|---|---|
| 11,339,950 | B2* | 5/2022 | Wu | ........................ F21V 15/01 |
| 2018/0120633 | A1* | 5/2018 | Yang | ................ G02F 1/133524 |
| 2019/0196086 | A1 | 6/2019 | Schenkl et al. | |
| 2019/0249485 | A1* | 8/2019 | Jeong | ................. F21V 33/0044 |
| 2021/0271016 | A1* | 9/2021 | Arihara | .................... G09F 9/33 |

FOREIGN PATENT DOCUMENTS

| EP | 3333519 A1 | 6/2018 |
|---|---|---|
| KR | 101804407 B1 | 12/2017 |

* cited by examiner

*Primary Examiner* — Keith G. Delahoussaye
(74) *Attorney, Agent, or Firm* — Laurence A. Greenberg; Werner H. Stemer; Ralph E. Locher

(57) ABSTRACT

A lighting module is provided for a refrigeration appliance. The lighting module includes: a housing, provided with a light outlet; a light source, located in the housing; a light guide plate, adapted to guide light from the light source toward the light outlet; and an elastic member, adapted to deform to maintain a position of the light guide plate with respect to the light source and/or the light outlet.

10 Claims, 5 Drawing Sheets

LIGHTING MODULE AND REFRIGERATION APPLIANCE WITH LIGHTING MODULE

CROSS-REFERENCE TO RELATED APPLICATION

This application claims the priority, under 35 U.S.C. § 119, of Chinese Patent Application CN 202022361129.9, filed Oct. 21, 2020; the prior application is herewith incorporated by reference in its entirety.

FIELD AND BACKGROUND OF THE INVENTION

Embodiments of the present utility model relate to a lighting module and a refrigeration appliance with a lighting module.

A refrigeration appliance is provided with a lighting module configured to illuminate a storage compartment. In some existing technologies, a lighting module, with light from a light source in it distributed in a light guide plate, becomes a surface light source lighting module with more uniform light distribution. It is found that the light guide plate may change physically as temperature varies, for example, expand with heat and contract with cold. Such a characteristic poses a challenge to its use in some scenarios of the refrigeration appliance.

SUMMARY OF THE INVENTION

An objective of embodiments of the present utility model is to provide an improved lighting module for a refrigeration appliance and a refrigeration appliance with such a lighting module.

Another objective of the embodiments of the present utility model is to provide a lighting module for a refrigeration appliance that helps to improve lighting stability in different environments and a refrigeration appliance with such a lighting module.

In an aspect, the embodiments of the present utility model relate to a lighting module for a refrigeration appliance, including: a housing, provided with a light outlet; a light source, located in the housing; a light guide plate, located between the light outlet and a cover, and adapted to guide light from the light source toward the light outlet; and an elastic member, located between the light guide plate and the cover, and configured to apply a force toward the light outlet to the light guide plate.

Therefore, even though the light guide plate is made of a material that tends to expand or contract, the light guide plate can still maintain a relatively constant position under the action of the elastic member to adapt to different use environments.

In some possible embodiments, the housing includes a frame provided with the light outlet and the cover. The elastic member and the light guide plate may be clamped between the cover and the frame, to make the elastic member deform to apply the force toward the light outlet to the light guide plate. In an aspect, the frame and the cover allow the lighting module to be formed into a substantially stable pre-assembled body. In another aspect, the elastic member and the light guide plate are clamped by the frame and the cover, so that a deformation degree of the elastic member can be automatically adjusted along with a status of the light guide plate, to further improve the quality of the lighting module.

In some possible embodiments, the elastic member may be in surface contact with an inner surface of the cover facing the light guide plate, so as to enhance uniformity of deformation of the elastic member.

In some possible embodiments, the cover and the frame are fastened, in such a way that the elastic member in an accommodating space is pressed in a direction perpendicular to the light outlet and is adjustable according to the status of the light guide plate.

In some possible embodiments, the frame may be provided with a plurality of through holes distanced from one another. The cover is provided with a plurality of hooks distanced from one another, and the hooks are connected to the through holes in a snap-fit manner, so that the elastic member is pressed in the direction perpendicular to the light outlet and is adjustable according to the status of the light guide plate.

In some possible embodiments, the lighting module may include a reflecting layer located between the light guide plate and the cover, the elastic member being located between the reflecting layer and the cover.

In some possible embodiments, the elastic member may be in the form of a sheet.

In some possible embodiments, the light guide plate includes a first end surface facing the light source and a second end surface opposite to the first end surface. The elastic member is located between the second end surface and the housing, to apply a force toward the light source to the light guide plate.

In some possible embodiments, the elastic member is clamped between the second end surface and the housing.

In some possible embodiments, the elastic member is in the form of a sheet and is bonded to the housing.

In some possible embodiments, the elastic member is made of elastic foam.

In some possible embodiments, the housing includes a frame provided with the light outlet and the cover connected to the frame. The frame includes a supporting edge surrounding the light outlet and an inner frame surrounding the supporting edge and protruding toward the cover. The light source includes a light emitting element and a substrate bearing the light emitting element. The substrate is mounted on the frame along an inner side of the inner frame. The light guide plate is supported on the supporting edge. The substrate is basically perpendicular to the light guide plate, and a first end surface of the light guide plate and the light emitting element face each other.

In another aspect, the embodiments of the present utility model relate to a refrigeration appliance, including a storage compartment and the lighting module configured to illuminate the storage compartment according to any of the foregoing.

In some possible embodiments, a housing is provided with a plurality of first snap-fit connection structures distanced from one another and a plurality of second snap-fit connection structures distanced from one another. The housing includes a frame and a cover. A light source and a light guide plate are located in an accommodating space defined by the frame and the cover. The first snap-fit connection structures are configured to fasten the lighting module into a mounting slot reachable through the storage compartment. The second snap-fit connection structures are configured to connect the frame to the cover in a snap-fit manner. The first snap-fit connection structures and the second snap-fit connection structures are arranged in a staggered manner.

Other features which are considered as characteristic for the invention are set forth in the appended claims.

Although the invention is illustrated and described herein as embodied in a lighting module and a refrigeration appliance with lighting module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
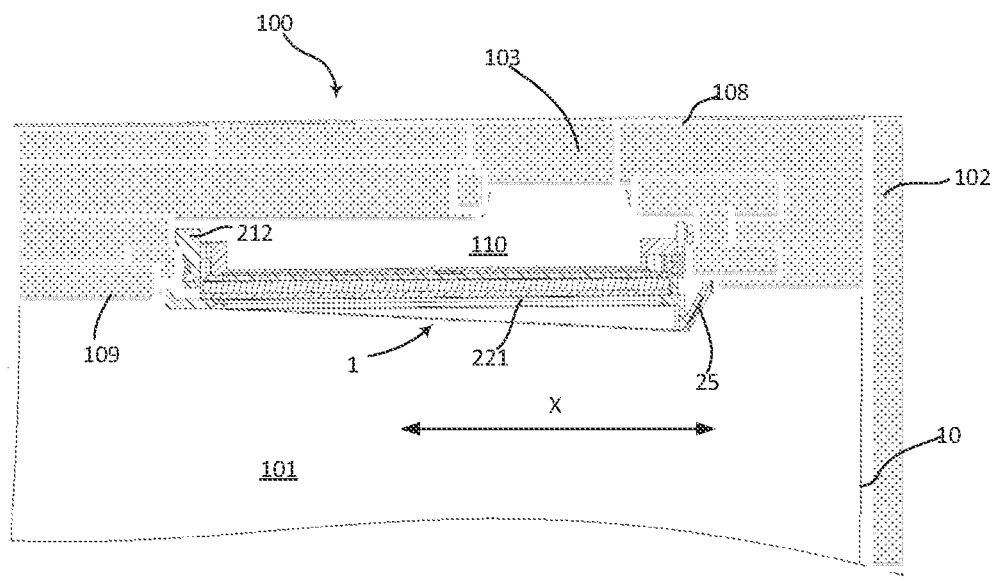
FIG. 1 is a diagrammatic, partial sectional view of a refrigeration appliance with a lighting module according to an embodiment of the invention.

Referring now to the figures of the drawings in detail and first, particularly to FIG. 1 thereof, there is shown a refrigeration appliance 100 includes a main body 108. The main body 108 may be provided with a storage compartment 101 having a front opening 10. The storage compartment 101 may be selectively opened or closed by a door 102.

The storage compartment 101 includes a top wall 103, a pair of side walls (not marked), and a rear wall (not shown). The rear wall of the storage compartment 101 faces the front opening 10. At least some of these inner walls may be defined by a liner 109 of the main body 108.

The refrigeration appliance 100 includes a lighting module 1 configured to illuminate the storage compartment 101. The lighting module 1 is reachable through the storage compartment 101.

Figure 2:
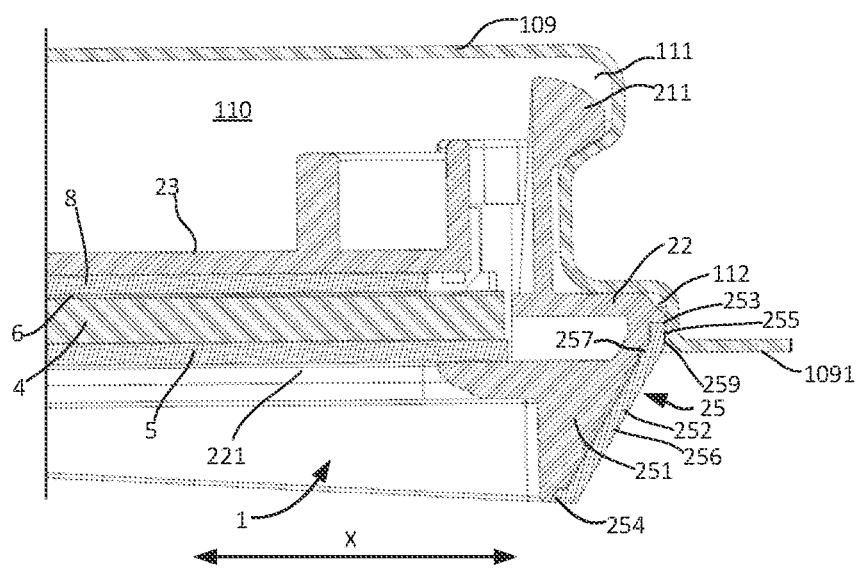
FIG. 2 is a partial, enlarged sectional view of the refrigeration appliance according to an embodiment of the invention.

As shown in FIG. 1 and FIG. 2, the refrigeration appliance 100 includes a mounting slot 110 for mounting the lighting module 1.

In an implementation, the mounting slot 110 may be formed by a mounting shell mounted along a through hole of the liner 109 and joined to a thermal insulation material in the main body 108. In the embodiment shown in FIG. 1, the mounting slot 110 is formed by the liner 109 denting in a direction away from the storage compartment 101.

The lighting module 1 includes a housing 2. The housing 2 is provided with a first snap-fit connection structure 21 for connecting to the mounting slot 110, to detachably fasten the lighting module 1 on a box body 102. As shown in FIG. 2, the first snap-fit connection structure 21 may be provided with a plurality of hooks 211 and 212. The hooks 211 and 212 cooperate with a slot 111 in the mounting slot 110 to fasten the lighting module 1 on the main body 108.

In an exemplary embodiment, the lighting module 1 may be disposed on the top wall 103. It may be easily understood that, in another embodiment, the lighting module 1 may be alternatively disposed on the side wall or the rear wall of the storage compartment 101.

The housing 2 is provided with a light outlet 221. Light enters the storage compartment 101 through the light outlet 221. As shown in FIG. 1, the light outlet 221 may be substantially horizontally disposed at the top of the storage compartment 101, and the light outlet 221 is located at the bottom of the housing 2. The housing 2 may include a front wall 25 facing the front opening 10.

When mounted on the top wall 103 of the storage compartment 101, the front wall 25 is inclined from top to bottom and has a lower part closer to the rear than an upper part. This makes a front surface of the front wall 25 more easily visible to a user under the top wall 103.

In an embodiment, the front wall 25 includes a main part 251 and a decorative strip 252 fastened on a front side of the main part 251.

The decorative strip 252 may be bonded to the main part 251 by an adhesion apparatus 258. The decorative strip 252 may be made of metal or a plastic base material provided with a metallic decorative layer thereon.

An upper end of the decorative strip 252 extends into the mounting slot 110. The mounting slot 110 may be constructed with a step form at a position near the entrance, and therefore is provided with a relatively shallow concave portion 112. The upper end of the decorative strip 252 extends into the concave portion 112.

The main part 251 of the front wall 25 may be provided with a pit 2510 for accommodating the decorative strip 252, and the decorative strip 252 is located in the pit 2510. A connecting seam 253 exposed to the front surface of the front wall 25 is provided between upper ends of the main part 251 and the decorative strip 252. In an exemplary embodiment of the present utility model, the connecting seam 253 is completely located in the mounting slot 110, and is completely covered by a front inner wall surface of the mounting slot 110 in a longitudinal direction X of the storage compartment 101.

As shown in FIG. 2, the connecting seam 253 is located in the concave portion 112 and is disposed opposite to a front inner wall surface of the concave portion 112 in the longitudinal direction X of the storage compartment 101 and completely covered by the latter. Therefore, there may be a better visual transition between a front side of the lighting module 1 and the liner 109.

The decorative strip 252 may include an upper end portion 255 located at an upper end, a lower end portion 254 located at a lower end, and a decorative portion 256 located between the upper end portion 255 and the lower end portion 254. A front surface of the decorative portion 256 is a bevel sloping from top to bottom. At least the front surface of the decorative portion 256 is mostly visible to a user.

An angle is formed between the upper end portion 255 and the decorative portion 256. A front surface of the upper end portion 255 may extend in a vertical direction and/or may be parallel to the front inner wall surface of the mounting slot 110. A connecting ridge 259 between the upper end portion 255 and the decorative portion 256 may be located above an edge part 1091, surrounding the mounting slot 110, of the liner 109. This helps to obtain simple design.

The lower end portion 254 is connected to a lower end of the decorative portion 256. The lower end portion 254 bends from the decorative portion 256 and extends backward, so that a connecting seam between the lower end portion 254 and the main part 251 is completely located behind a rear surface of the decorative portion 256 in the longitudinal direction X of the storage compartment 101. At least a part of a lower surface of the front wall 25 is formed by the lower end portion 254. This helps to improve a decorative effect.

A rear side of the decorative strip 252 may be provided with a positioning portion 257 protruding toward the main part 251. The main part 251 includes a corresponding recess (not marked). The positioning portion 257 is located in the recess to position the decorative strip 252.

The front hook 211 of the first snap-fit connection structure 21 may be connected to the slot 111 above and behind the decorative strip 252. In an embodiment, during mounting of the lighting module 1, a rear end of the lighting module 1 may be placed in the mounting slot 110 first, to cause the rear hook 212 of the first snap-fit connection structure 21 to abut against the rear slot in the mounting slot 110 to form a pivot. Then, the lighting module 1 is rotated around the pivot, to press the front hook 211 into the mounting slot 110 to connect to the slot 111 in a snap-fit manner, so as to complete mounting of the lighting module 1. As the front hook 211 of the first snap-fit connection structure 21 is connected to the slot 111 above and behind the decorative strip 252, and the upper end of the decorative strip 252 is located in the relatively shallow concave portion 112, a possibility that the decorative strip 252 severely interferes with the liner 109 and causes the liner to fall off during the mounting of the lighting module 1 is significantly reduced.

The following describes the specific structure of the lighting module 1 according to an embodiment of the present utility model in detail with reference to the accompanying drawings.

Figure 3:
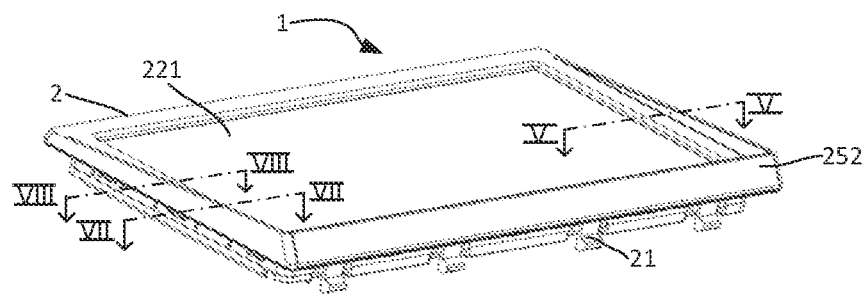
FIG. 3 is a perspective view of a lighting module according to an embodiment of the invention.
Figure 4:
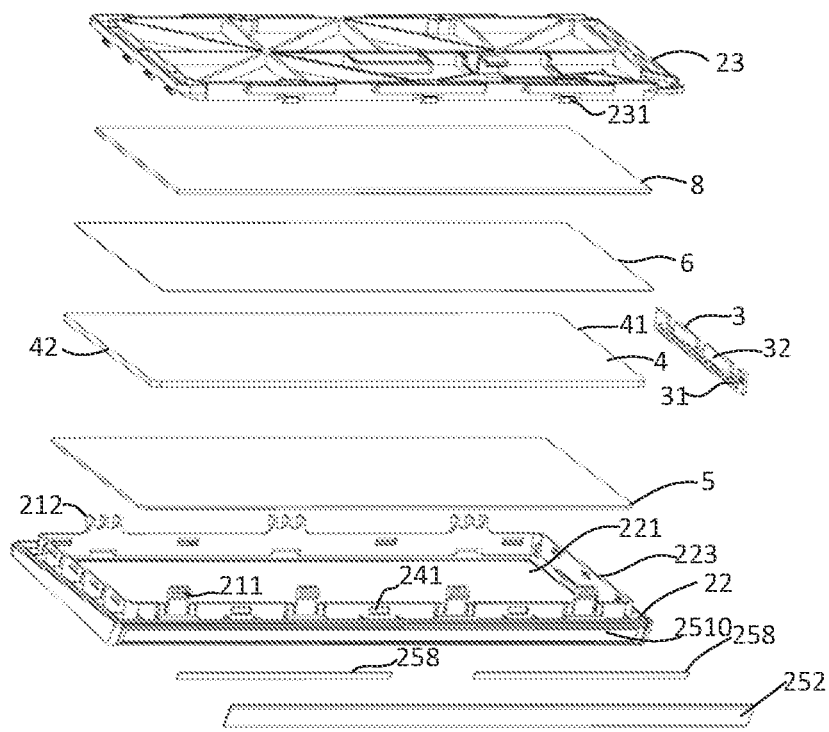
FIG. 4 is an exploded, perspective of the lighting module according to an embodiment of the invention.

Referring to FIG. 3 and FIG. 4, the housing 2 may include a frame 22 and a cover 23. A light source 3 of the lighting module 1 is located in an accommodating space 26 defined by the frame 22 and the cover 23.

The frame 22 may be made of opaque plastic. The frame 22 is provided with a light outlet 221 in a wall exposed to the storage compartment 101. Light illuminates the storage compartment 101 through the light outlet 221.

The lighting module 1 includes a light guide plate 4. The light guide plate 4 is located between the light outlet 221 and the cover 23. The light guide plate 4 is adapted to guide light from the light source 3 toward the light outlet 221.

The light guide plate 4 may include a plurality of lattice points. Light in the light guide plate 4 may concentrate again at the lattice points. The lattice points may be formed through printing or by concave/convex point portions.

The light source 3 is located in the housing 2. The light source 3 may include a plurality of light emitting elements 31 and a substrate 32 bearing the light emitting elements 31. The light emitting elements 31 may be light-emitting diodes.

The light guide plate 4 may cover the light outlet 221 completely and may be basically parallel to the light outlet 221. The light guide plate 4 includes a first end surface 41 facing the light source 3 and a second end surface 42 opposite to the first end surface 41. Light emitted from the light source 3 enters the light guide plate 4 through the first end surface 41.

The lighting module 1 may further include a diffusion board 5 located between the light guide plate 4 and the light outlet 221, to diffuse light from the light guide plate 4 uniformly, so that light from the light outlet 221 is basically uniform.

The lighting module 1 may further include a reflecting layer 6 located between the light guide plate 4 and the cover 23, to cause light to illuminate the diffusion board 5 in a manner as close to total reflection as possible.

The reflecting layer 6, the light guide plate 4, and the diffusion board 5 may be disposed adjacent to each other in sequence between the cover 23 and the light outlet 221.

It is found that the light guide plate 4 is likely to expand in an environment with relatively high temperature or humidity and contract in an environment with relatively low temperature or humidity. Expansion caused by temperature change is reversible while expansion caused by humidity change is not. When the lighting module 1 is mounted in storage compartments of the refrigeration appliance 100 with different temperature or humidity, the light guide plate 4 may change in size to different degrees. As a result, lighting quality of the same lighting module 1 varies in the different storage compartments. For example, lighting quality of the lighting module in a refrigerating compartment and lighting quality of the lighting module in a freezing compartment are different after a particular period. Lighting quality of the lighting module 1 in the same storage compartment may also be unstable when temperature in the storage compartment is set to different temperature zones. In some existing solutions, components in the housing 2 are glued together to form an undetachable and watertight module.

Figure 5:
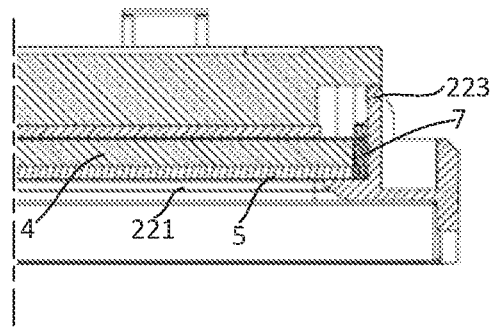
FIG. 5 is a sectional view taken along the line V-V shown in FIG. 3.

To resolve this problem, as shown in FIG. 5, the lighting module 1 according to an embodiment of the present utility model may include a first elastic member 7. The first elastic member 7 may be sandwiched between the second end surface 42 of the light guide plate 4 and the housing 2 to apply a force toward the light source 3 to the light guide plate 4, so that regardless of a storage compartment in which the lighting module 1 is mounted or even though the lighting module 1 is mounted in a storage compartment with different temperature zones or humidity zones, the first end surface 41 of the light guide plate 4 may maintain a constant position with respect to the light source 3, thereby improving compatibility of the lighting module 1 in the refrigeration appliance 100 and/or helping to obtain stable lighting quality.

The first elastic member 7 may be fastened at the housing 2. In an embodiment, the first elastic member 7 may be made of elastic foam and bonded to the housing 2.

Figure 6:
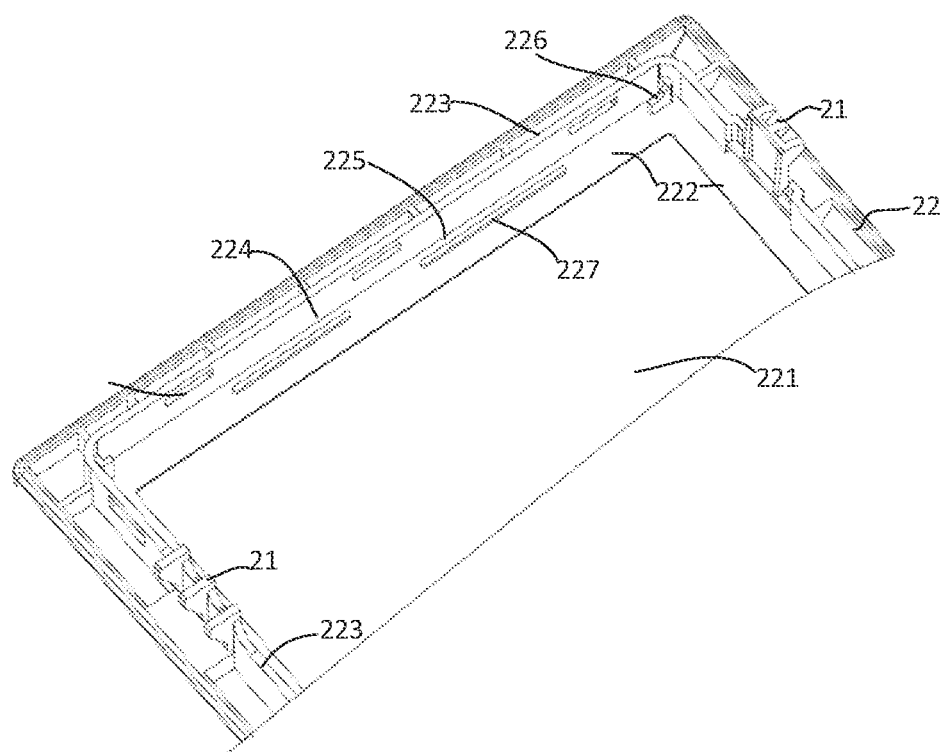
FIG. 6 is a perspective view of a frame according to an embodiment of the invention.

Referring to FIG. 4 and FIG. 6, a second snap-fit connection structure 24 is disposed between the cover 23 and the frame 22 to fasten the cover 23 and the frame 22 reliably. The second snap-fit connection structure 24 may include a plurality of hooks 231 that are provided at one of the cover 23 and the frame 22 and are distanced from one another and first through holes 241 provided at the other of the cover 23 and the frame 22 for matching the corresponding hooks 231.

The first snap-fit connection structure 21 and the second snap-fit connection structure 24 may be arranged in a staggered manner to prevent mutual interference.

Figure 7:
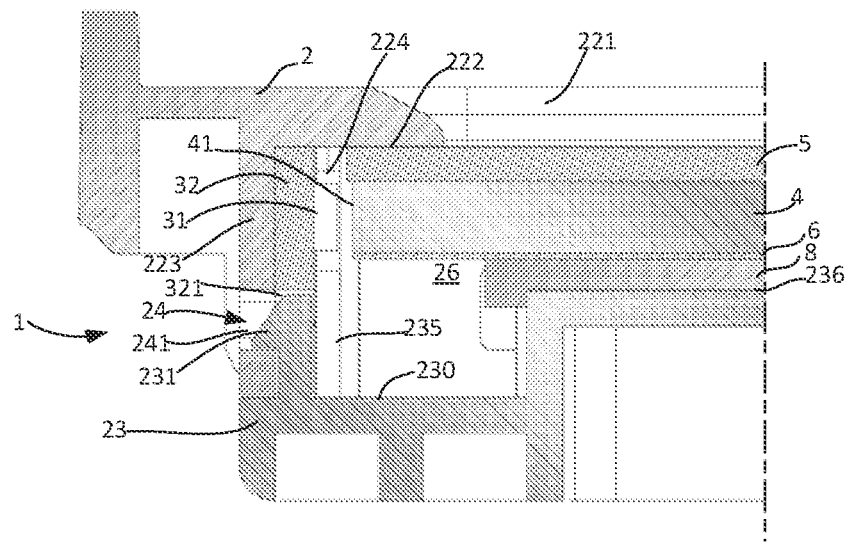
FIG. 7 is a sectional view taken along the line VII-VII shown in FIG. 3.
Figure 8:
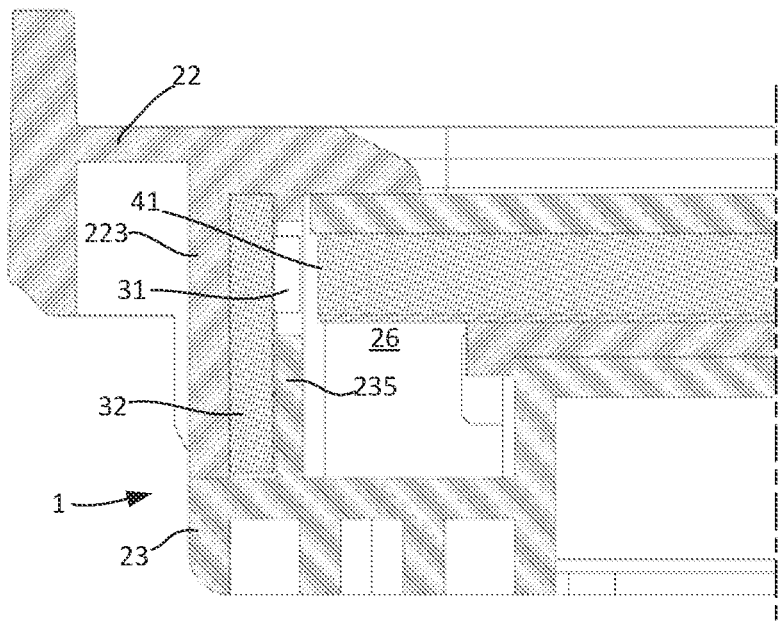
FIGS. 8 and 9 are sectional views taken along the line VIII-VIII shown in in FIG. 3.
Figure 9:
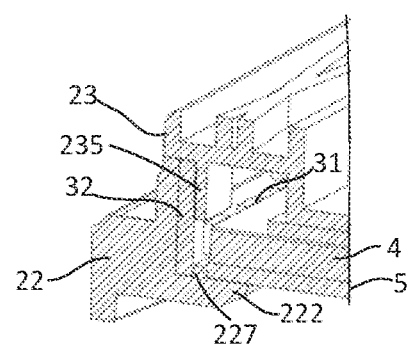

As shown in FIG. 5, FIG. 6, and FIG. 7, the light guide plate 4, the diffusion board 5, and the reflecting layer 6 are sandwiched between the cover 23 and the frame 22. Specifically, the frame 22 may include a supporting edge 222 surrounding the light outlet 221. An edge of the diffusion board 5 is supported on the supporting edge 222. Therefore, the light guide plate 4 located on a rear side of the diffusion board 5 is indirectly supported by the supporting edge 222.

After the cover 23 and the frame 22 are fastened, a distance between the cover and the frame is relatively fixed. The light guide plate 4 may expand or contract in a reversible or irreversible manner in different environmental conditions (such as temperature and humidity). In view of this, the lighting module 1 may include a second elastic member 8 located between the light guide plate 4 and the cover 23. The second elastic member 8 is configured to apply a force toward the light outlet 221 to the light guide plate 4, so that the light guide plate 4 maintains a relatively constant position with respect to the diffusion board 5 in a direction perpendicular to the light guide plate 4.

The second elastic member 8 and the light guide plate 4 are clamped between the cover 23 and the frame 22, to make the second elastic member 8 deform to apply the force toward the light outlet to the light guide plate 4.

The second elastic member 8 is in contact with an inner surface 236 of the cover 23 facing the light guide plate 4. The second elastic member 8 may be located between the reflecting layer 6 and the cover 23. The second elastic member 8 may be in the form of a sheet, so that the light guide plate 4 bears the force more uniformly. The second elastic member 8 may be made of elastic foam.

After the cover 23 is fastened on the frame 22 by the second snap-fit connection structure 24, the second elastic member 8 is sandwiched between the light guide plate 4 and the cover 23 and deformed. Therefore, even though the light guide plate 4 expands or contracts to different degrees in different environments, the second elastic member 8 may still adjust a position of the light guide plate 4 with respect to the diffusion board 5 in the direction perpendicular to the light guide plate 4. A size of the second elastic member 8 may be configured for the second elastic member 8 to remain deformed within a deformation range of the light guide plate 4.

In an exemplary embodiment, the housing 2 includes a supporting edge 222 surrounding the light outlet 221 and an inner frame 223 surrounding the supporting edge 222. The inner frame 223 protrudes from the supporting edge 222 in a direction away from the light outlet 221. There may be a distance between the inner frame 223 and an outer circumferential surface of the housing 2. The light guide plate 4 and the diffusion board 5 are supported on an inner side surface of the supporting edge 222.

A mounting portion 224 is provided in a space defined by the first end surface 41, the supporting edge 222, and the inner frame 223 of the light guide plate 4.

The substrate 32 of the light source 3 is mounted on the mounting portion 224, so that the light emitting elements 31 and the first end surface 41 of the light guide plate 4 are disposed facing each other.

The substrate 32 is mounted on the frame 22 along an inner side of the inner frame 223. The substrate 32 may be basically arranged perpendicular to the light guide plate 4.

The supporting edge 222 and the inner frame 223 may be located on the frame 22. The mounting portion 224 may include an insertion groove 225 that is located on the frame 22 and is used for positioning the substrate 32. A part of an inner surface of the insertion groove 225 may be formed by the inner frame 223 and/or the supporting edge 222.

The housing 2 may include a pair of first limit portions 226 located at both ends of the mounting portion 224. Each of the first limit portions 226 may protrude inward a particular distance from an inner surface of the inner frame 223 and then extend toward the other limit portion 226, so as to form end portions of the mounting portion 224 to limit both ends of the substrate 32.

The housing 2 may further include a protruding rib 227 located between the pair of first limit portions 226. There is a preset distance between the protruding rib 227 and the inner surface of the inner frame 223, so as to limit the substrate 32 in the middle of the substrate 32.

The first elastic member 7 is located between the second end surface 42 of the light guide plate 4 and the inner frame 223 to apply the force toward the light source 3 to the light guide plate 4. The first elastic member 7 may be fastened on the inner frame 223, for example, bonded to the inner frame 223. Under the action of the first elastic member 7, the first end surface 41 of the light guide plate 4 may remain abutting against the first limit portions 226 and/or the protruding rib 227, so as to improve the reliability of emitting light into the light guide plate 4 by the light emitting elements 31.

In a direction perpendicular to the light outlet 221, a height of the inner frame 223 may be greater than a total thickness of the diffusion board 5, the light guide plate 4, the reflecting layer 6, and the second elastic member 8 stacked together. In the direction perpendicular to the light outlet 221, a height of the substrate 32 is also greater than the total thickness of the diffusion board 5, the light guide plate 4, the reflecting layer 6, and the second elastic member 8 stacked together, and protrudes from the second elastic member 8 in the direction away from the light outlet 221. This facilitates smooth placement of the substrate 32 in the mounting portion 224 even in a narrow space.

The cover 23 may include a second limit portion 235 protruding from an inner surface 230 facing the light outlet 221. The second limit portion 235 and a side close to the cover 23 of the substrate 32 are in contact facing each other to limit the substrate 32. Therefore, the mounting portion 224 is configured to make the light emitting elements 31 exposed to the light guide plate 4 in a range as large as possible. In addition, the substrate 32 may still be firmly fastened in the housing 2 through the limiting of the second limit portion 235.

The substrate 32 may be provided with a plurality of avoidance holes 321, so that the second snap-fit connection structure 24 may still pass through the substrate 32 to connect the cover 23 and the frame 22 even though the height of the substrate 32 increases.

For example, at a position corresponding to the mounting portion 224, the inner frame 223 may be provided with a plurality of first through holes 241 distanced from one another. The cover 23 is provided with a plurality of hooks 231 for extending into the first through holes 241 to be engaged with the first through holes. The avoidance holes 321 are provided corresponding to the first through holes 241. The avoidance holes 321 may be closed holes or formed by notches at an edge of the substrate 32.

The second limit portion 235 may be located between adjacent hooks 231 in a length direction of the substrate 32.

As shown in FIG. 7, in a direction perpendicular to the substrate 32, the second limit portion 235 may be located on an inner side of the hooks 231. That is, a distance between the second limit portion 235 and the substrate 32 in the direction perpendicular to the substrate 32 is greater than a distance between the hooks 231 and the substrate 32 in the direction perpendicular to the substrate 32.

In the foregoing embodiment, through the adaptive adjustment of the first elastic member and/or the second elastic member in the housing, even though the light guide plate expands or contracts in the refrigeration appliance, the light guide plate can still maintain a relatively constant position with respect to the light source and/or the light outlet, so that the lighting module for a refrigeration appliance is likely to keep stable lighting quality in different environments with the light source, the light guide plate, the diffusion board, and other components thereof fastened together without glue.

In addition, the upper end of the decorative strip of the lighting module extends into the mounting slot. Therefore, the connecting seam between the decorative strip and the housing can be cleverly concealed in the mounting slot, and there may be a simple transition between the liner and the decorative strip, which helps to provide the refrigeration appliance with better quality.

Various embodiments described with reference to FIG. 1 to FIG. 9 may be combined with each other in any given manner to achieve the advantage of the present utility model. In addition, the present utility model is not limited to the shown embodiments. Usually, apart from the shown means, other means may also be used provided that the means can achieve the same effect.

The invention claimed is:

1. A lighting module for a refrigeration appliance, the lighting module comprising:
   a housing having a light outlet formed therein, said housing having a frame provided with said light outlet and a cover;
   a light source disposed in said housing;
   a light guide plate adapted to guide light from said light source toward said light outlet;
   an elastic member adapted to deform to maintain a position of said light guide plate with respect to said light source and/or said light outlet;
said elastic member and said light guide plate being clamped between said cover and said frame making said elastic member deform for applying a force toward said light outlet to said light guide plate; and
   a reflecting layer disposed between said light guide plate and said cover, said elastic member being disposed between said reflecting layer and said cover.

2. The lighting module according to claim 1, wherein:
   said frame has a supporting edge surrounding said light outlet and an inner frame surrounding said supporting edge and protruding toward said cover;
   said light source having a light emitting element and a substrate bearing said light emitting element, said substrate is mounted on said frame along said inner frame; and
   said light guide plate is supported on said supporting edge, said substrate is disposed perpendicular to said light guide plate, and a first end surface of said light guide plate and of said light emitting element face each other.

3. The lighting module according to claim 1, wherein said elastic member is in surface contact with an inner surface of said cover facing said light guide plate.

4. The lighting module according to claim 1, wherein said cover and said frame are fastened in such a way that said elastic member in an accommodating space is pressed in a direction perpendicular to said light outlet, and is adjustable according to a status of said light guide plate.

5. The lighting module according to claim 1, wherein said elastic member is made of an elastic foam.

6. The lighting module according to claim 1, wherein:
   said light guide plate has a first end surface facing said light source and a second end surface disposed opposite to said first end surface; and
   said elastic member is disposed between said second end surface and said housing, to apply a force toward said light source to said light guide plate.

7. The lighting module according to claim 6, wherein said elastic member is clamped between said second end surface and said housing.

8. The lighting module according to claim 6, wherein said elastic member is bonded to said housing.

9. A lighting module for a refrigeration appliance, the lighting module comprising:
   a housing having a light outlet formed therein, said housing having a frame provided with said light outlet and a cover;
   a light source disposed in said housing;
   a light guide plate adapted to guide light from said light source toward said light outlet; and
   an elastic member adapted to deform to maintain a position of said light guide plate with respect to said light source and/or said light outlet;
   said elastic member and said light guide plate being clamped between said cover and said frame making said elastic member deform for applying a force toward said light outlet to said light guide plate;
   said cover and said frame being fastened in such a way that said elastic member in an accommodating space is pressed in a direction perpendicular to said light outlet, and is adjustable according to a status of said light guide plate said frame having a plurality of through holes formed therein and distanced from one another; and
   said cover having a plurality of hooks distanced from one another, said hooks being connected to said through holes in a snap-fit manner, so that said elastic member is pressed in the direction perpendicular to said light outlet, and is adjustable according to the status of said light guide plate.

10. A refrigeration appliance, comprising:
    a storage compartment having a mounting slot formed therein; and
    a lighting module configured for illuminating said storage compartment and including:
      a housing having a light outlet formed therein, said the housing having a frame and a cover, said housing having a plurality of first snap-fit connection structures distanced from one another and a plurality of second snap-fit connection structures distanced from one another, said first snap-fit connection structures configured for fastening said lighting module into said mounting slot reachable through said storage compartment, said second snap-fit connection structures configured for connecting said frame to said cover in a snap-fit manner, and said first snap-fit connection structures and said second snap-fit connection structures disposed in a staggered manner;
      a light source disposed in said housing;
      a light guide plate adapted to guide light from said light source toward said light outlet;
      said light source and said light guide plate being disposed in an accommodating space defined by said frame and said cover; and
      an elastic member adapted to deform to maintain a position of said light guide plate with respect to said light source and/or said light outlet.

* * * * *